US006785325B1

(12) United States Patent
Liu et al.

(10) Patent No.: US 6,785,325 B1
(45) Date of Patent: Aug. 31, 2004

(54) DSL SPLITTER PROVIDING TEST ACCESS TO AN INTERCONNECTED SUBSCRIBER LOOP AND METHOD

(75) Inventors: Gin Liu, Brampton (CA); Anthony Peck, Fremont, CA (US); Alfred Haw, Scarborough (CA)

(73) Assignee: Nortel Networks Limited, St. Laurent (CA)

( * ) Notice: Subject to any disclaimer, the term of this patent is extended or adjusted under 35 U.S.C. 154(b) by 633 days.

(21) Appl. No.: 09/588,699

(22) Filed: Jun. 7, 2000

(51) Int. Cl.[7] ............................................. H04B 1/38
(52) U.S. Cl. .................. 375/220; 379/29.01; 379/27.06
(58) Field of Search ............................... 375/222, 220, 375/224, 260; 370/241; 379/27.06, 29.01

(56) References Cited

U.S. PATENT DOCUMENTS

| | | | |
|---|---|---|---|
| 5,757,803 A | 5/1998 | Russell et al. | 370/494 |
| 5,889,856 A | 3/1999 | O'Toole et al. | 379/399 |
| 5,930,340 A | 7/1999 | Bell | 379/93.08 |
| 6,181,775 B1 * | 1/2001 | Bella | 379/29.01 |
| 6,477,249 B1 * | 11/2002 | Williamson et al. | 379/399.01 |

OTHER PUBLICATIONS

ITU–T Telecommunication Standardization Sector of ITU, Recommendation G.992.1 Annex E, Pots and ISDN–BA splitters, p 1–16. (2000).

Turnstone Systems Inc., Addition of Remote Actuated Metallic Bypass Capability to CO Splitter Standard, Committee T1—Telecommunications, Working Group T1E1.4/2000–190R1 (DSL Access), May 1–5, 2000, Revision Uploaded on May 10, 2000, p 1–10.

\* cited by examiner

*Primary Examiner*—Stephen Chin
*Assistant Examiner*—Kevin Kim (57) ABSTRACT

A DSL splitter providing test access to an interconnected subscriber loop and method are disclosed. The DSL splitter in a first test mode, provides access to allow testing of an interconnected subscriber loop by way of a DSL input. A disconnect in series with an associated low pass filter (LPF) disconnects POTS input. Such a splitter may similarly provide access to allow testing of the subscriber loop by way of the POTS input in a second test mode. In this second test mode, a by-pass by-passes the LPF, and a disconnect may disconnect an associated high pass filter (HPF) and DSL input. Preferably, the splitter only assumes its test modes after receipt of authorization from the other provider. The splitter may be controllable by way of a control circuit having an access port used to receive commands to have the splitter assume its normal, or first or second test mode. The splitter may assume its normal operating mode from a test mode, after expiry of a timeout timer.

23 Claims, 6 Drawing Sheets

| COMMAND | NOTE |
|---|---|
| ACT | ACTIVATE TEST |
| DEA | DE-ACTIVATE TEST |
| ENA | ENABLE OTHER PROVIDER ABILITY TO TEST |
| DIS | DISABLE OTHER PROVIDER ABILITY TO TEST |
| QUIT | |
| REF | RESET TIME-OUT TIMER |
| ECH XX | XX=ON OR OFF : ENABLE/DISABLE ECHO |
| LST | LIST STATUS OF PORT OR MODEM |
| TMO XX | SET TIME-OUT INTERVAL TO XX SECONDS |

DSL SPLITTER PROVIDING TEST ACCESS TO AN INTERCONNECTED SUBSCRIBER LOOP AND METHOD

FIELD OF THE INVENTION

The present invention relates to telephony systems, methods and devices, and more particularly to a DSL splitter and method that provide access to an interconnected subscriber loop.

BACKGROUND OF THE INVENTION

In recent years, the demand for high bandwidth data services to customer premises has increased dramatically. Recent telephony advances have allowed the use of the existing copper wire subscriber loop to carry traffic at increased bandwidths. Now, through the use of digital subscriber line (DSL) technology, the existing subscriber loop, typically terminated at a central office (CO), may be used to carry broad band data. In fact, several DSL variants have been developed. These include HDSL, IDSL, SDSL, RADSL, and ADSL (collectively often referred to as xDSL).

To allow DSL services to co-exist with conventional telephone services on the same loop, some of the developed technologies use frequency division multiplexing to permit the copper wire to carry conventional voice signals at relatively low frequencies, and data at higher frequencies. Notably, asymmetric DSL (ADSL) allows the plain old telephone service (POTS) to coexist with DSL services on the same subscriber loop. POTS services are transmitted over the POTS frequency band of the loop. This band operates from about 100 Hz to 4 kHz. Upstream and downstream bands at higher frequencies carry data from and to the subscriber, and are isolated in frequency from each other and from the POTS band.

Accordingly, ADSL services are typically provided at a CO through use of a splitter that includes a high pass filter (HPF) and a low pass filter (LPF). The HPF is used to pass DSL signals from and to the loop, while the low pass filter is used to pass POTS signals from and to the loop. International Telephony Union Recommendation G.992.1, and ANSI Standard T1E1.4/98007R4, the content of which are both hereby incorporated by reference, for example, includes detailed specifications for a CO ADSL splitter.

In view of the ability to provide two distinct services over a single loop, it has now become possible for two separate service providers to provide POTS and DSL services independently. In fact, recent regulatory changes in some jurisdictions have mandated existing owners of the subscriber loops provide access to competitive service providers. As a result Incumbent local exchange carriers ("ILEC"s) typically lease space to competitive service providers (known as competitive local exchange carrier ("CLEC")) within a CO, and provide access to DSL or POTS ports of installed CO splitters.

As a result of multiple provider access to the subscriber loop, each of the providers also needs the facility to test the physical loop. Conventional POTS testing may be performed through the LPF of the splitter. However, this is often unsatisfactory as the test may be affected by the characteristics of the LPF as well as by the presence of the HPF and DSL equipment on the loop. Similarly, testing of the loop by a DSL provider is impeded by the presence of the HPF, the LPF and POTS equipment. DSL testing, in particular, typically requires wide band testing often performed using time-domain reflectometry. In fact, empirical evidence reveals that presence of the LPF impacts the magnitude of the wide band noise measurement resulting being 15 to 20 dB lower than it should be.

Thus, as will be appreciated, independent direct test access to the loop by the two providers is highly desirable.

Accordingly, an improved device allowing both POTS and DSL providers the ability to test an interconnected subscriber loop are desirable.

SUMMARY OF THE INVENTION

In accordance with an aspect of the present invention, a DSL splitter in a first test mode, allows testing of an interconnected subscriber loop by way of a DSL input. A disconnect in series with an associated LPF disconnects the POTS input. Such a splitter may similarly provide access to allow testing of the subscriber loop by way of the POTS input in a second test mode. In this second test mode, a by-pass by-passes the LPF, and a disconnect may disconnect an associated HPF and DSL input. Preferably, the splitter only assumes its test modes after receipt of authorization from the other provider. The splitter may be controllable by way of a control circuit having an access port used to receive commands to have the splitter assume its normal, or first or second test mode.

In accordance with another aspect of the invention, a splitter facilitating modulation of digital subscriber line (DSL) signals and conventional telephony signals onto a telephone subscriber loop includes first and second inputs, for receiving the DSL signals and conventional telephony signals, respectively; and an output in communication with the first input. The output may interconnect the splitter to the telephone subscriber loop. An LPF is in communication with the second input and the output. A first controllable disconnect is in series with the LPF, and is controllable to disconnect the second input in a first test mode, only in response to receiving commands from both a conventional telephone service provider providing the conventional telephone signals and from a DSL service provider providing the DSL signals at the splitter.

In accordance with a further aspect of the invention, a splitter facilitating the modulation digital subscriber line (DSL) and conventional telephony signals onto a telephone subscriber loop includes, a first and second inputs, for receiving the DSL signals and conventional telephony signals, respectively; and an output, in communication with the first input. This output is for interconnecting the splitter to the telephone subscriber loop. An LPF is in communication with the second input and the output. A first controllable disconnect is in series with the LPF, and is controllable to disconnect the second input from the output in a first test mode. A control circuit in communication with the first disconnect controls the disconnect so as to disconnect the second input from the output in a first test mode. This control circuit includes an access port to receive control commands to control operation of the first disconnect.

In accordance with yet a further aspect of the invention, a method of providing test access to a subscriber loop, interconnected with a first digital subscriber line (DSL) provider and a second conventional telephone service provider by way of a splitter, includes providing test access through the splitter, after receiving instructions from one of the providers and authorization from the other provider.

In accordance with another aspect of the invention, a method of operating a splitter interconnecting a first digital subscriber line (DSL) provider and a second conventional telephone service provider, with a subscriber loop includes causing the splitter to assume a test mode that provides one of the providers test access to the subscriber loop through the splitter. After a timeout period the splitter assumes a normal operating mode, allowing the providers to again provide conventional telephone and DSL signals by way of the subscriber loop.

Use of an access port to control the operating modes of the splitter conveniently allows changing modes of the splitter using out-of-band signalling. Such a splitter may be used with conventional test equipment.

Advantageously, the control circuit may prevent one service provider from initiating loop testing without authorization of the other provider.

Advantageously, the control circuit may also prevent the splitter from remaining in one of its test modes indefinitely.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate by way of example only, embodiments of this invention.

DETAILED DESCRIPTION

Figure 1:
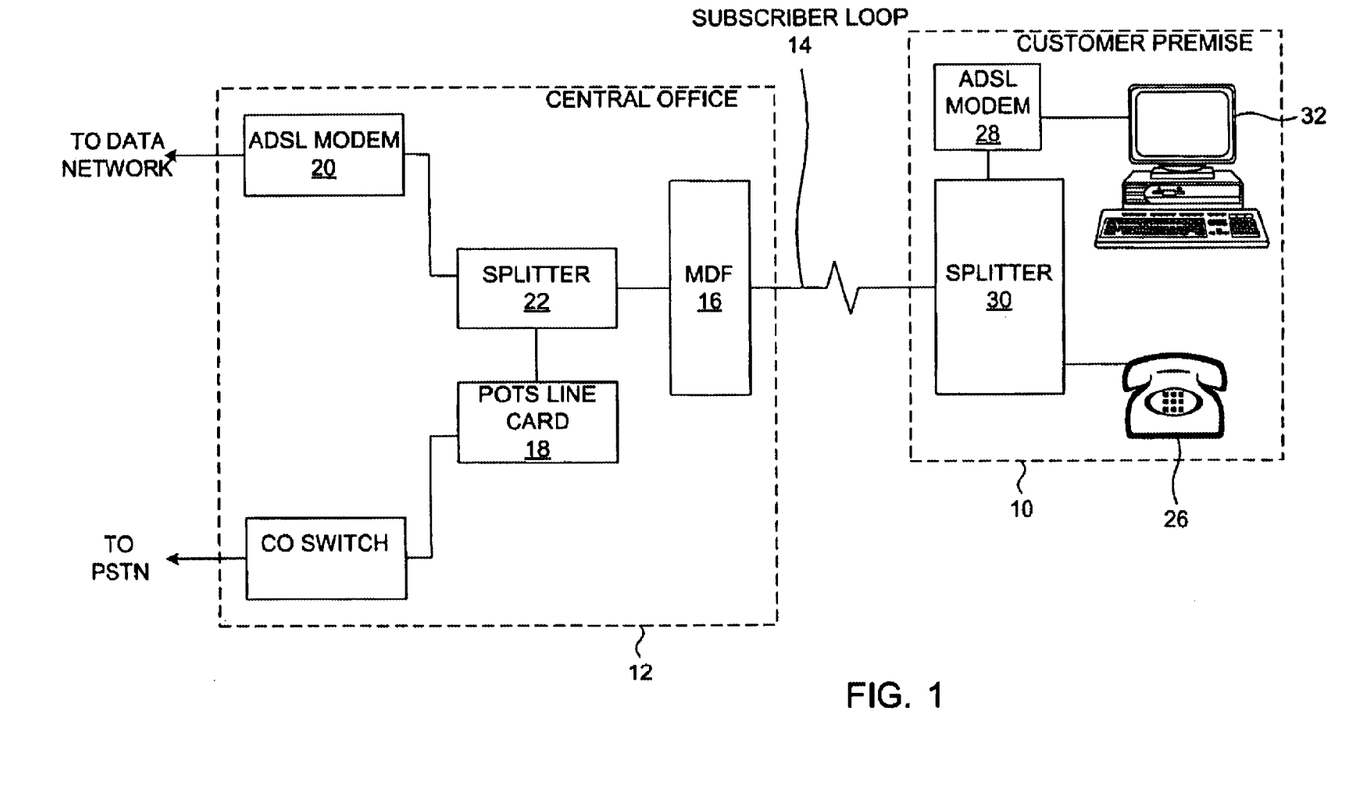
FIG. 1 is a block diagram illustrating a CO including a DSL splitter, exemplary of an embodiment of the present invention, interconnected to a customer premise.

FIG. 1 illustrates the interconnection of a conventional DSL and POTS subscriber at example customer premises 10 to a CO 12. A single subscriber loop 14 interconnects POTS line card 18 and ADSL modem 20 of CO 12 to customer premise 10 by way of a main distribution frame ("MDF") 16 and CO splitter 22. CO splitter 22 is an exemplary embodiment of the present invention.

As will be appreciated, in the described embodiment, POTS line card 18 is one of many POTS line cards supplied by a local exchange carrier that provides subscriber POTS from equipment owned by the POTS provider and interconnected with the public switched telephone network ("PSTN"). Similarly, modem 20 is a conventional ADSL modem, typically interconnected with a data network and housed at equipment owned by a DSL provider. Space within the CO is typically leased to one or both the POTS provider and DSL provider. MDF 16 allows the cross-connection of multiple subscriber loops including loop 14, terminating at CO 12 to a plurality of splitters such as splitter 22, and is conventionally owned and operated by the ILEC.

At the customer premise 10, loop 14 is interconnected with a complementary splitter 30 that provides voice band signals to telephone 26, and higher band ADSL signals to customer ADSL modem 28. ADSL modem 28 may be interconnected with a conventional computing device 32. Subscriber loop 14 provides ADSL and POTS service to customer premises 10 in a conventional manner.

Figure 2:
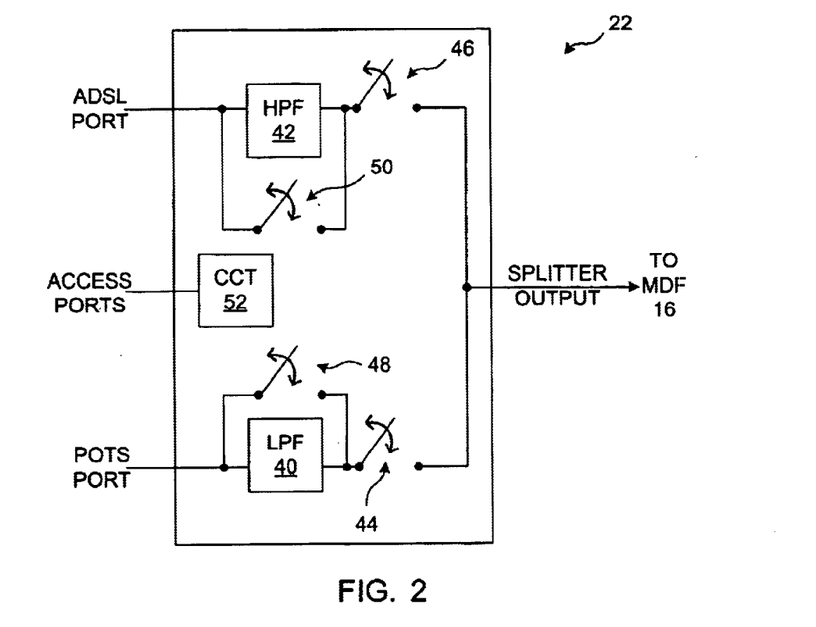
FIG. 2 is a simplified schematic diagram of the splitter of FIG. 1.

A simplified schematic diagram of splitter 22, exemplary of an embodiment of the present invention, is illustrated in FIG. 2. As illustrated, splitter 22 includes a conventional LPF 40 and HPF 42 in communication with splitter inputs for connection to POTS line card 18 (FIG. 1) and DSL modem 20, respectively. Outputs of LPF 40 and HPF 42 are interconnected to the splitter output to MDF 16 by way of first and second controllable disconnects 44 and 46. LPF 40 and HPF 42 are preferably passive low and high pass filters, as for example described in the above noted ITU Recommendation and ANSI Standard, having suitable cut-off frequencies for use to filter POTS and ADSL bands, respectively on loop 14. As will be appreciated, LPF 40 and HPF 42 could similarly be formed using active components, such as one or more suitably programmed digital signal processors. Connection between LPF 40 and the splitter output to MDF 16 is switchable by disconnect 44. Similarly, connection between HPF 42 and the splitter output is switchable by disconnect 46. Disconnects 44 and 46 may be formed using conventional relays. These are preferably solid state and normally closed. Of course, disconnects 44 and 46 could be formed in any other way understood by those of ordinary skill in the art.

By-passes 48 and 50 are connected in parallel with LPF 40 and HPF 42, respectively, so that LPF 40 and HPF 42 may be shunted by the by-passes 48 and 50. Again, by-passes 48 and 50 may be formed by solid state relays that are normally open. Of course, by-passes 48 and 50 could be formed in any other way understood by those of ordinary skill.

A control and interface circuit 52 is in communication with disconnects 44 and 46, and by-passes 48, and 50, and couples splitter 22 to a control device.

As will be readily apparent, each of disconnects 44, 46, and by-passes 48 and 50 has two states: open and closed. First by-pass 48 is normally open, and in its closed state provides a low impedance by-pass of LPF 40. Similarly, second by-pass 50 is normally open and in its closed state provides a low impedance by-pass of HPF 42. First disconnect 44 is in series with LPF 40, and thus, in its open state disconnects LPF 40 from the splitter output interconnected with MDF 16, and connects LPF 40 and any interconnected POTS line card 18 (FIG. 1) to the splitter output in its dosed state. Second disconnect 46 similarly connects and disconnects HPF 42 and any interconnected DSL modem 20 in its closed and open states, respectively. As illustrated, disconnects 44 and 46 are preferably connected in series between the outputs of LPF 40 and HPF 42 and the output of splitter 22, respectively.

Figure 3:
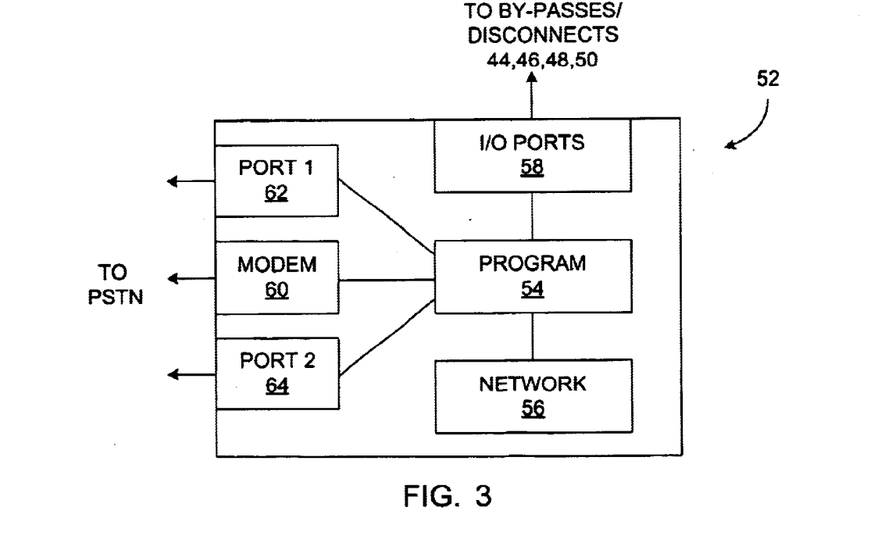
FIG. 3 is a simplified schematic diagram of a portion of the splitter of FIG. 2.

A simplified schematic diagram of control and interface circuit 52 is illustrated in FIG. 3. As illustrated, control and interface circuit 52 includes a conventional processor 54 in communication with computer readable memory 56, an input/output port 58, a modem 60, and two access ports 62 and 64. Processor 54 may be any conventional processor, such as an Intel x86 processor, a Motorola 68xxx processor, a micro-controller, or any other processor known to those of ordinary skill in the art. Memory 56 is preferably any suitable combination of volatile and persistent computer readable memory, and preferably includes programmable read-only memory, and random access memory. Memory 56 contains program code, described below, adapting processor 54 and thus splitter 22 to function in manners exemplary of the present invention. Processor 54 is further in communication with input/output port 58 that, in turn is operatively connected to controllable disconnects and by-passes 44, 46, 48 and 50 (FIG. 2). Input/output port 58 may, for example, be controlled by processor 54 under software control, in order to individually energize or de-energize a relay forming an interconnected by-pass or disconnect. In the described embodiment, two access ports 62 and 64 allow processor 54 to receive instructions from complementary ports, external to splitter 22. Access ports 62 and 64 are preferably conventional RS232 serial ports, but could be formed using parallel ports, modems, or any other suitable access ports usable to communicate with processor 54. Additional modem 60 also optionally allows processor 54 to receive instructions from an interconnected modem. Modem 60 is also preferably conventional and may be a modem adhering to ITU Recommendation V. 90. A source of power (not shown) provides an operating current to control and interface circuit 52.

Figure 4A:
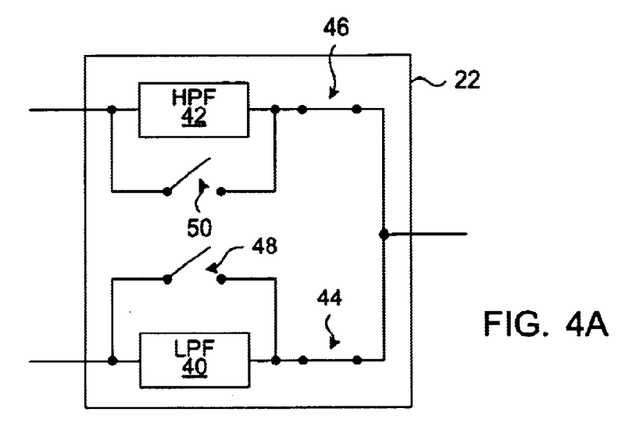
FIG. 4A is a simplified block diagram of the splitter of FIG. 2, in its normal operating mode.

In the normal operating mode of splitter 22, illustrated in FIG. 4A, disconnects 44 and 46 are closed, and by-passes 48 and 50 are open. Both POTS line card 18 and ADSL modem 20 (FIG. 1) are thus in communication with splitter output by way of HPF 42 and LPF 40. In a first test mode, illustrated in FIG. 48 by-pass 50 is closed and disconnect 44 is open. By-pass 48 and disconnect 46 are open and closed, respectively. Now, direct access to loop 14 by way of the splitter input connected to ADSL modem 20 is provided. An example test head 66 is illustrated. Similarly, in a second test mode, illustrated in FIG. 4C disconnect 46 and by-pass 50 are in their open state and disconnect 44 and by-pass 48 are in their closed state. In this second test mode direct access to loop 14 is provided at POTS line card (FIG. 1). Another example test head 68 is illustrated. Software, described below, causes splitter 22 to assume one of its normal operating mode, first test mode, and second test mode illustrated in FIGS. 4A to 4C, in response to commands received at serial ports 62, 64 or modem 60.

As should be appreciated, disconnects 44 and 46 could be connected between the inputs of splitter 22 and inputs of LPF 40 and HPF 42, to disconnect the LPF 40 and HPF 42. First and second test modes could then include by-passes 48 and 50 in their closed states.

Figure 5A:
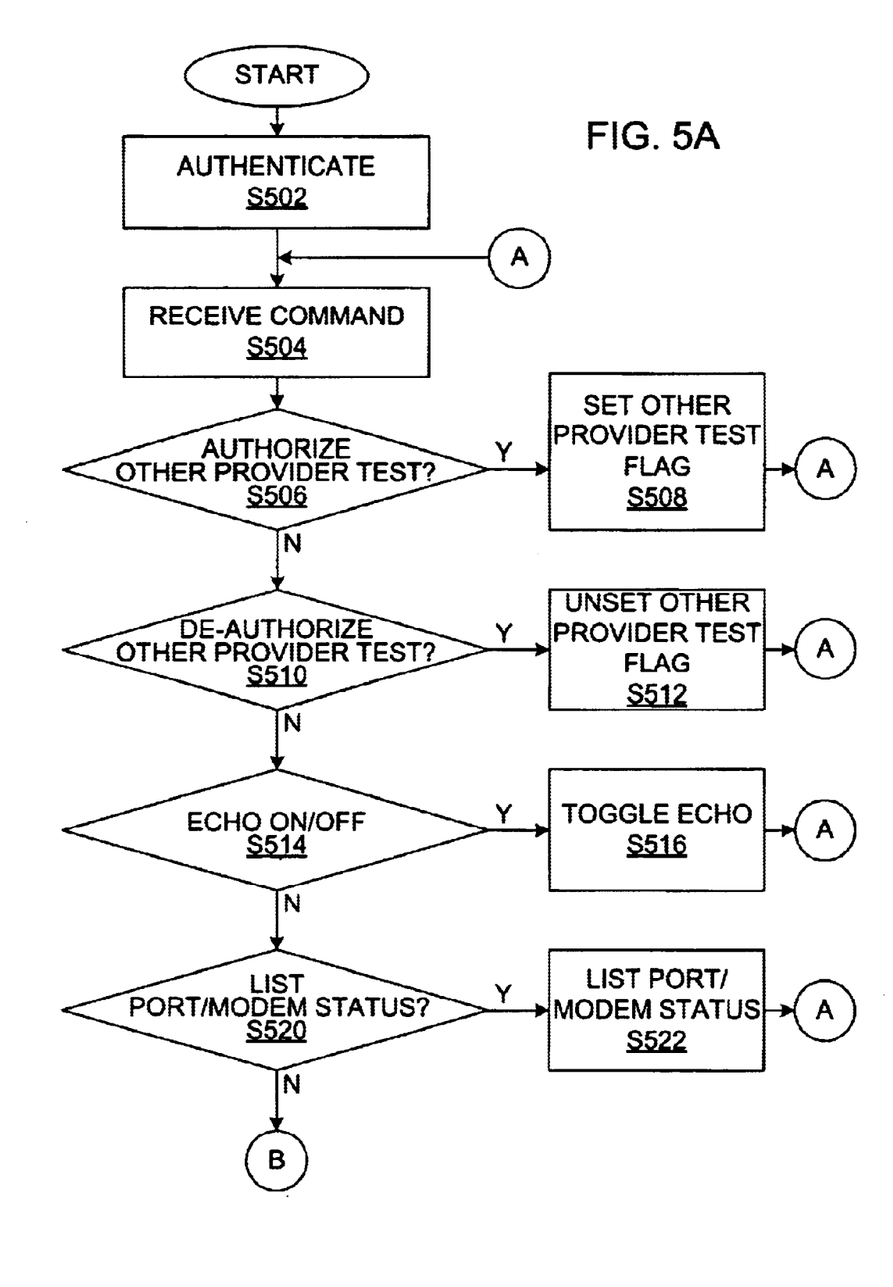
FIGS. 5A and 5B are flow charts of steps performed at the splitter of FIG. 2.
Figure 5B:
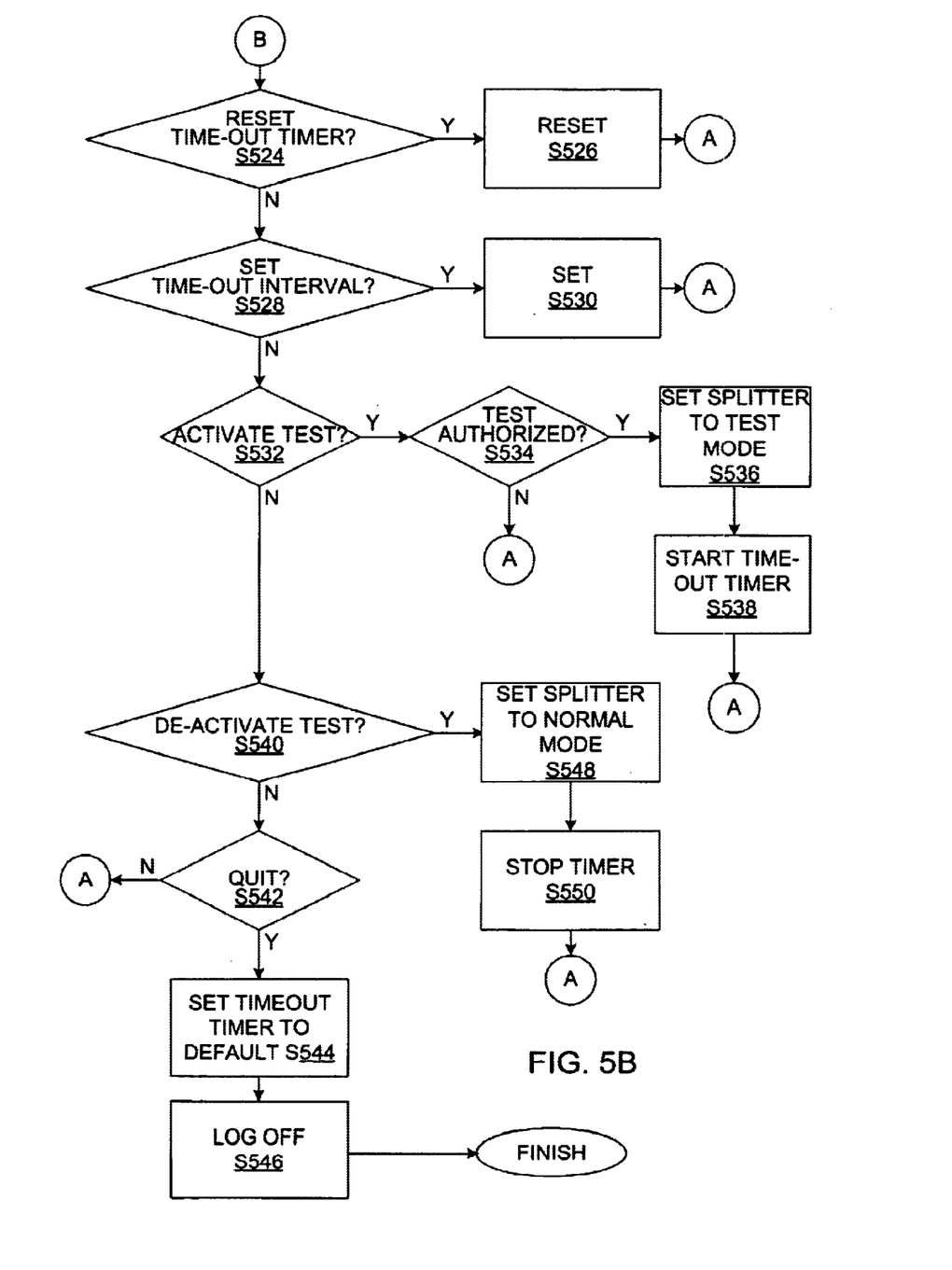

In operation, splitter 22 is typically first In its normal operating mode, as illustrated in FIG. 4A. Software controlling operation of splitter 22, preferably stored within memory 56 causes processor 54 to monitors ports 62, 64 and modem 60. Port 64 is preferably interconnected with control facilities of the POTS provider. Similarly, port 62 is preferably interconnected with control facilities of the DSL provider. Alternatively, either DSL provider or POTS provider may communicate with splitter 22 by way of modem 60, which is preferably interconnected with the PSTN. Specifically, steps performed at splitter 22 are illustrated in FIGS. 5A and 5B.

In the exemplary embodiment, and as described below, POTS provider and DSL provider may control splitter 22 by establishing a connection and providing appropriate ASCII commands at one of ports 62, 64 and modem 60. While ASCII based commands are convenient, a person skilled in the art will readily recognize that control commands could have any other suitable format understood by those of ordinary skill in the art.

Figure 6:
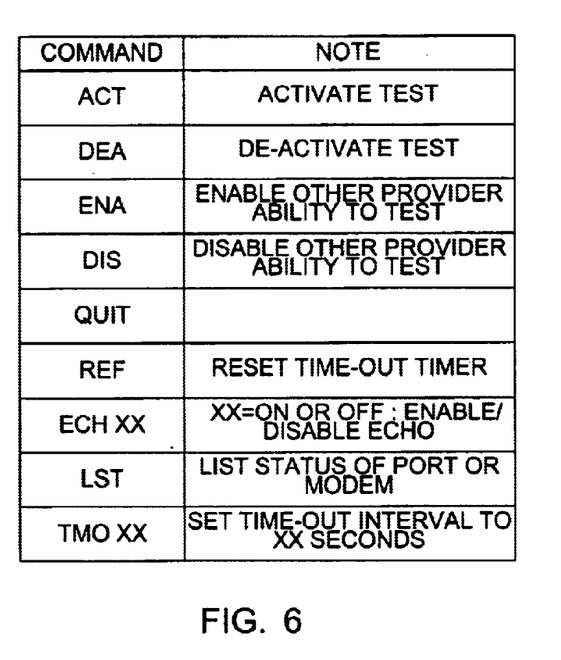
FIG. 6 illustrates exemplary commands used to control the operation of the splitter of FIG. 2.

So, in step S502 a provider wanting to test the physical loop 14 (i.e. POTS or DSL provider) communicates with one of ports 62, 64 or modem 60 and is authenticated. This may be effected by software at splitter 22 merely noting which of ports 62 or 64 is being accessed, or by receiving an identifier and/or password by way of modem 60, authenticating the provider, or in any other conventional way. Once a POTS or ADSL provider has been authenticated, a command may be received at the relevant port in step S504. In the preferred embodiment, several commands are recognized by splitter 22. Each of these may be provided in ASCII by an authenticated provider. Specifically, exemplary splitter 22 recognizes an "Activate Test" relay (ACT) command; a "Deactivate test relay" (DEA) command; an "Enable Test Permission" (ENA) command; a Disable Test Permission (DIS) command; a timeout timer reset (REF) command; an input echo on/off (ECH) command; a logout command (QUIT); a list port status (LST) command; and a set timeout (TMO) command. Specific preferred ASCII formats of the recognized commands are illustrated in FIG. 6.

Thus, in step S504 a command is received by way of the relevant port 62, 64 or modem 60. Based on the value of a stored echo flag stored within memory 56 (FIG. 3), this command may be echoed back to the relevant port 62, 64 or modem 60. This command is compared to known commands in steps S506, S510, S514, S520, S524, S528, S532, S540, and S542.

So, in the event the ENA command is entered, as determined in step S506, a flag within memory 56 is set allowing the other service provider (i.e. the DSL provider, in the event the current port is accessed by the POTS provider; the POTS provider otherwise) to conduct a test in step S508. In the event the DIS command is entered, as determined in step S510 this flag is reset in step S512. In the event an ECH ON or ECH OF command is entered, as determined in step S514 an echo flag is toggled in S516. In the event the LST command is entered as determined in step S520, the status of the relevant port is echoed to the serial port or modem in step S522. Thus, one provider may be advised that another provider is contacting the splitter by way of another access port.

If the REF command has been entered as determined in step S524, a timeout timer maintained at control circuit 52, and discussed below, is reset to its maximum value in step S526. Preferably, after a user starts testing using a program, this program will send a REF command within the timeout interval. The test may continue indefinitely, as long as the REF command is sent periodically. If the test program losses contact with the splitter, the timeout timer can thus expire, and the splitter is returned to its operating mode.

Similarly, a timeout interval of XX seconds for this timer may be set in step S530 in response to entry of TMO XX command in step S528.

Figure 4B:
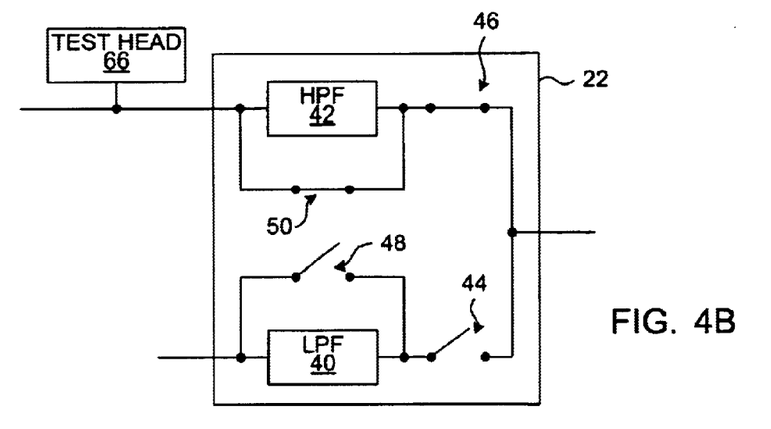
FIG. 4B is a simplified block diagram of the splitter of FIG. 2, in a first test mode.
Figure 4C:
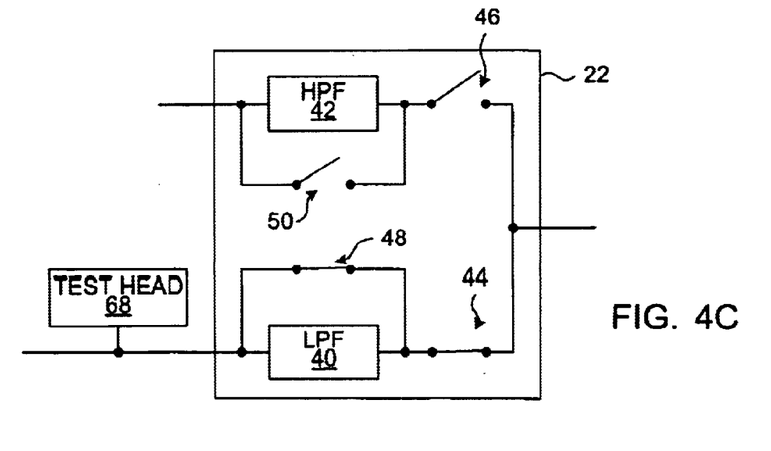
FIG. 4C is a simplified block diagram of the splitter of FIG. 2, in a second test mode.

In the event the contacting provider wishes to conduct a test, the ACT command is entered and recognized in step S532. In response processor 54 determines whether the testing provider has been authorized to perform the test by the other provider in step S534. If so, and if the provider has been authenticated as the ADSL provider, processor 54 toggles by-pass 50 to assume its closed state and disconnect 44 to assume its open state, thereby causing splitter 22 to assume its first test mode (i.e. ADSL test mode) as illustrated in FIG. 4B, in step S536. Alternatively, if the requesting provider is the POTS provider, processor 54 toggles by-pass 48 and disconnect 46 to assume their closed and open states respectively, thereby causing splitter 22 to assume its second test mode, as illustrated in FIG. 4C, in step S536. Conveniently, processor 54 may prevent one provider (POTS or ADSL) from causing splitter 22 to assume an associated test mode, if the other provider (ADSL or POTS) is currently testing the subscriber loop, thus preventing inadvertent conflict between the two providers. As well, in step S538 the timeout timer is set to its maximum value determined by the value set in S530 or by the default maximum value. As a consequence, the time may be decremented in steps S702 and onward (FIG. 7), described below.

If the DEA command is entered, as determined in step S540, processor 54 resets splitter 22 to its normal operating mode with by-passes 48, 50 open and disconnects 44, 46 closed, thereby placing splitter 22 into its normal operating mode in step S548. The timeout timer is set to zero in step S550.

Lastly, in the event the QUIT command is entered in step S504, as determined in step S542 the provider is logged out in step S546 after the value for timeout interval is set to some default value in step S544. This value for the timeout interval is set to a default, so that the next user of splitter 22 can expect the splitter to timeout within this default interval, unless the set timer value is set in step S530. At the completion of processing each command, steps S504 and onwards are repeated, allowing a contacting provider to enter multiple commands.

Figure 7:
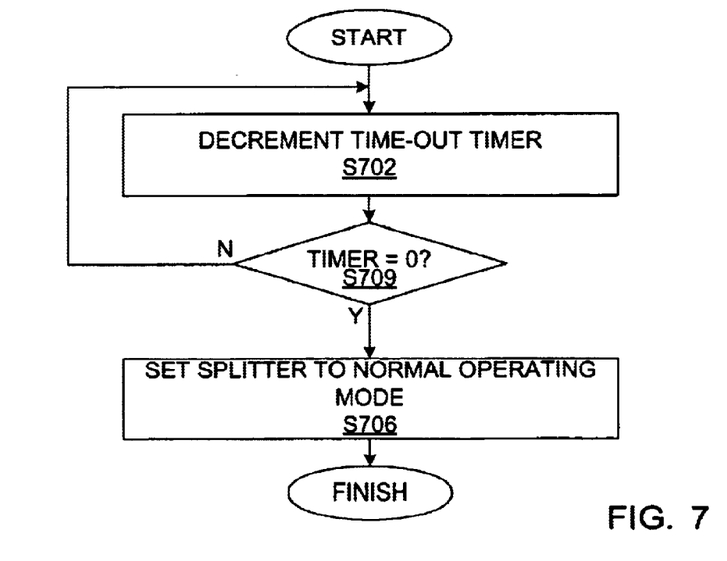
FIG. 7 is a further flow chart of steps performed at the splitter of FIG. 2.

At the same time, in the event the timeout timer that may be reset in step S526 is non-zero, it is decremented with time as illustrated in FIG. 7. Specifically, the timeout timer is decrement in real time, once per second, until it reaches a value of zero, in steps S702 and S704. Once the timeout timer is decremented to zero, processor 54 sets disconnects 44 and 46 to their closed state, and by-passes 48 and 50 to their open state, thus causing splitter 22 to assume its normal operating mode, as illustrated in FIG. 4A, in step S706. As noted, the testing provider should therefore reset the timer periodically to avoid expiry of the timeout timer.

So, as should now be appreciated, each of the POTS and DSL providers interconnected with splitter 22 can only cause splitter 22 to assume its relevant test mode after the other provider (ie DSL provider for POTS test, and POTS provider for DSL test) has approved such a test by entering the ENA command at one of ports 62, 64 and modem 60. Moreover, timeout timer maintained at splitter 22 prevents one provider from inadvertently leaving splitter in one of its test modes. Of course, timeout timer could be used in numerous ways. For example, the timeout timer could be reset any time a command is received at a port being used for testing. Alternatively, the timeout timer could be initially to a high value facilitating most tests, and thereby not requiring periodic reset.

Once splitter 22 is in its first or second test mode, the POTS or DSL provider, respectively may connect a test head 66 or 68 directly to the POTS and DSL inputs of the splitter as illustrated in FIGS. 4B and 4C. Conveniently, if groups of POTS line cards, or DSL modems, operated by the POTS or DSL provider are interconnected by a test matrix, this matrix may be used to interconnect the test head to the splitter 22. As the POTS or DSL input of splitter 22 provides direct access to loop 14, broadband time domain reflectometry and similar loop tests understood by those of ordinary skill in the art, may be performed by POTS or DSL providers.

As should now also be appreciated, as a test by a DSL provider typically requires broad-band access, a splitter providing only direct test access by way of DSL input may be advantageous. Similarly, as will be understood by those of ordinary skill, a splitter substantially similar to splitter 22 may be formed without a HPF. That is, DC blocking capacitors forming part of such a splitter or part of an ADSL modem at the CO may block the POTS signals to the ADSL modem. Accordingly, a splitter including a single LPF and a suitable disconnect for the POTS input may also be exemplary of an embodiment of the present invention, suitable to provide test access to a subscriber loop.

Of course, the above described embodiments, are intended to be illustrative only and in no way limiting. The described embodiments of carrying out the invention, are susceptible to many modifications of form, arrangement of parts, and details of operation. The invention, rather, is intended to encompass all such modification within its scope, as defined by the claims.

What is claimed is:

1. A splitter facilitating modulation of digital subscriber line (DSL) signals and conventional telephony signals onto a telephone subscriber loop, said splitter comprising:
   a first input, for receiving said DSL signals;
   a second input for receiving said conventional telephony signals;
   an output in communication with said first input, said output for interconnecting said splitter to said telephone subscriber loop;
   a low pass filter (LPF) in communication with said second input and said output; and
   a first controllable disconnect in series with said LPF, controllable to disconnect said second input in a first test mode, only in response to receiving commands from both a conventional telephone service provider providing said conventional telephone signals and from a DSL service provider providing said DSL signals at said splitter.

2. The splitter of claim 1, further comprising:
   a high pass filter (HPF) in communication with said first input and said output; and
   a first controllable by-pass, controllable so as to by-pass said HPF and provide direct access to said subscriber loop by way of said first input, in said first test mode.

3. The splitter of claim 2, wherein said first by-pass comprises a switch in parallel with said HPF so as to shunt said HPF in said first test mode.

4. The splitter of claim 2, further comprising:
   a second controllable by-pass, controllable so as to by-pass said LPF and provide access to allow testing of said subscriber loop by way of said second input, in a second test mode.

5. The splitter of claim 4, wherein said second by-pass comprises a switch in parallel with said LPF so as to shunt said LPF in said second test mode.

6. The splitter of claim 5, further comprising a second controllable disconnect in series with said HPF, operable to disconnect said first input in said second test mode.

7. The splitter of claim 6, further comprising a control circuit operatively connected to said first by-pass, said second by-pass, said first disconnect and said second disconnect in order to switch said first by-pass, said second by-pass, said first controllable disconnect, and said second disconnect in said first test mode and said second test mode.

8. The splitter of claim 7, further comprising a first port, in communication with said control circuit to receive control commands to switch said splitter between an operating mode, and at least one of said first test mode and said second test mode.

9. The splitter of claim 7, further comprising a second port in communication with said control circuit to receive said control commands.

10. The splitter of claim 8, further comprising a modem in communication with said control circuit to receive said control commands.

11. The splitter of claim 7, wherein said control circuit is operable to cause said splitter to assume its normal operating mode, with said first and second bypass open, and said first and second disconnect closed, after said splitter has been in said first test mode or said second test mode for a period of time.

12. The splitter of claim 7, wherein said control circuit only allows said splitter to assume said first test mode or said second test mode in response to receiving commands from a conventional telephone service provider providing said conventional telephone signals and from a DSL operator providing said DSL signals.

13. The splitter of claim 12, wherein said control circuit comprises a micro-processor.

14. The splitter of claim 13, wherein at least one of said first and second ports comprises a serial port.

15. A splitter facilitating the modulation digital subscriber line (DSL) and conventional telephony signals onto a telephone subscriber loop, said splitter comprising:
   a first input, for receiving said DSL signals;
   a second input for receiving said conventional telephony signals;
   an output, in communication with said first input, said output for interconnecting said splitter to said telephone subscriber loop;
   a low pass filter (LPF) in communication with said second input and said output;
   a high pass filter (HPF) in communication with said first input and said output;
   a first controllable by-pass, controllable so as to by-pass said HPF and provide direct access to said subscriber loop by way of said first input, in a first test mode;
   a first controllable disconnect in series with said LPF, controllable to disconnect said second input from said output in said first test mode; and
   a control circuit in communication with said first disconnect to control said first disconnect so as to disconnect said second input from said output in said first test mode, said control circuit including an access port to receive control commands.

16. The splitter of claim 15, wherein said control circuit comprises a processor.

17. The splitter of claim 15, wherein said access port comprises a serial port.

18. The splitter of claim 15, further comprising a modem in communication with said control circuit to receive said control commands.

19. The splitter of claim 15, wherein said control circuit is operable to cause said splitter to assume its normal operating mode after said splitter has been in said first test mode.

20. A method of providing test access to a subscriber loop, interconnected with a first digital subscriber line (DSL) provider and a second conventional telephone service provider by way of a splitter, comprising:
   receiving instructions from one of said first and second providers to provide test access through said splitter;
   receiving authorization from the other of said first and second providers to provide test access through said splitter;
   responsive to said receiving instructions and said receiving authorization, providing test access through said splitter.

21. The method of claim 20, further comprising:
   resetting said splitter to a normal operating mode, thereby removing said test access after expiry of a timeout timer.

22. The method of claim 21, further comprising resetting said timeout timer in response to receipt of an appropriate command.

23. A method of operating a splitter interconnecting a first digital subscriber line (DSL) provider and a second conventional telephone service provider, with a subscriber loop comprising:
   causing said splitter to assume a test mode, providing one of said first and second provider test access to said subscriber loop through said splitter in response to receiving instructions to assume said test mode from one of said first and second providers, and receiving authorization from the other one of said first and second providers; and
   after a timeout period causing said splitter to assume a normal operating mode, allowing said DSL provider to provide DSL signals to said subscriber loop and allowing said telephone service provider to provide conventional telephone signals by way of said subscriber loop.

* * * * *